US012736180B2

(12) United States Patent
Abe

(10) Patent No.: US 12,736,180 B2
(45) Date of Patent: Sep. 15, 2026

(54) HYDROGEN TANK

(71) Applicant: TOYOTA JIDOSHA KABUSHIKI KAISHA, Toyota (JP)

(72) Inventor: Takuma Abe, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/077,669

(22) Filed: Mar. 12, 2025

(65) Prior Publication Data

US 2026/0055848 A1 Feb. 26, 2026

(30) Foreign Application Priority Data

Aug. 23, 2024 (JP) ................................ 2024-143174

(51) Int. Cl.
*F17C 1/16* (2006.01)

(52) U.S. Cl.
CPC ........ *F17C 1/16* (2013.01); *F17C 2205/0305* (2013.01); *F17C 2209/2163* (2013.01); *F17C 2221/012* (2013.01)

(58) Field of Classification Search
CPC ........ F17C 2221/012; F17C 2203/0648; F17C 1/16; F17C 2205/0305; F17C 2209/2163
See application file for complete search history.

(56) References Cited

U.S. PATENT DOCUMENTS

2008/0296306 A1* 12/2008 Handa .................. F17C 11/005 220/581
2009/0308874 A1* 12/2009 Lindner .................... F17C 1/16 220/591
2024/0093834 A1 3/2024 Iida et al.
2025/0034506 A1* 1/2025 Li .......................... C12M 41/06
2025/0067399 A1* 2/2025 Rainville ......... B60K 15/03006

FOREIGN PATENT DOCUMENTS

JP 2024-043009 A 3/2024
WO 2015/001531 A1 1/2015

* cited by examiner

*Primary Examiner* — Shawn M Braden
(74) *Attorney, Agent, or Firm* — SoraIP, Inc.

(57) ABSTRACT

A hydrogen tank includes a fitting having a through-hole; a boss member disposed on an opposite side of the hydrogen tank from the fitting in a direction of an axis of the hydrogen tank; a rod-shaped member assembly configured by arranging rod-shaped members each having an elongated shape in a circumferential direction and a radial direction of the hydrogen tank such that the fitting and the boss member serve as a winding core, each of the rod-shaped members having a first end portion disposed on a fitting side and a second end portion disposed on a boss member side; and a reinforcing layer made of a fiber reinforced plastic and disposed to cover an outer peripheral surface of the rod-shaped member assembly. In the first end portion and the second end portion, the rod-shaped members adjacent to each other in the circumferential direction and the radial direction are bonded.

2 Claims, 7 Drawing Sheets

HYDROGEN TANK

CROSS-REFERENCE TO RELATED APPLICATION

This application claims priority to Japanese Patent Application No. 2024-143174 filed on Aug. 23, 2024. The disclosure of the above-identified application, including the specification, drawings, and claims, is incorporated by reference herein in its entirety.

BACKGROUND

1. Technical Field

The present disclosure relates to a hydrogen tank.

2. Description of Related Art

In the related art, as a technical field of this type, for example, there is a hydrogen tank described in Japanese Unexamined Patent Application Publication No. 2024-043009 (JP 2024-043009 A). The hydrogen tank disclosed in JP 2024-043009 A includes a liner including a body portion having a cylindrical shape and a pair of dome portions provided at both ends of the body portion in a direction of an axis, and a reinforcing layer covering the liner. The reinforcing layer is formed of a fiber reinforced plastic in which a resin is impregnated in a fiber bundle. In addition, in the reinforcing layer, a split structure including a body reinforcing layer corresponding to the body portion and a dome reinforcing layer corresponding to the dome portion is used. The body reinforcing layer and the dome reinforcing layer are bonded with an adhesive, such as an epoxy resin, with an end portion of the body reinforcing layer and an end portion of the dome reinforcing layer are overlapped with each other, such that the body reinforcing layer is positioned on the inner side and the dome reinforcing layer is positioned on the outer side.

SUMMARY

However, in the hydrogen tank described in JP 2024-043009 A, in order to ensure a bonding strength between the body reinforcing layer and the dome reinforcing layer, increase in an area of the end portions (that is, a bonding area between the body reinforcing layer and the dome reinforcing layer) in which the body reinforcing layer and the dome reinforcing layer are overlapped with each other is required. As a result, a problem occurs in that a usage amount of the fiber reinforced plastic for the reinforcing layer increases.

The present disclosure is made to solve such technical problem, and an object of the present disclosure is to provide a hydrogen tank capable of reducing the usage amount of a fiber reinforced plastic.

A hydrogen tank according to the present disclosure includes:

- a fitting having a through-hole;
- a boss member disposed on an opposite side of the hydrogen tank from the fitting in a direction of an axis of the hydrogen tank; a rod-shaped member assembly configured by arranging a plurality of rod-shaped members each having an elongated shape in a circumferential direction and a radial direction of the hydrogen tank such that the fitting and the boss member serve as a winding core, each of the rod-shaped members having a first end portion disposed on a fitting side and a second end portion disposed on a boss member side; and
- a reinforcing layer made of a fiber reinforced plastic and disposed to cover an outer peripheral surface of the rod-shaped member assembly,
- in which in the first end portion and the second end portion, the rod-shaped members adjacent to each other in the circumferential direction and the radial direction are bonded to each other, and
- in an intermediate portion between the first end portion and the second end portion, the rod-shaped members adjacent to each other in the circumferential direction and the radial direction are arranged such that gaps that communicate with the through-hole of the fitting are provided.

A hydrogen tank according to the present disclosure includes a rod-shaped member assembly and a reinforcing layer. The rod-shaped member assembly is configured by arranging the rod-shaped members each having an elongated shape in the circumferential direction and the radial direction of the hydrogen tank such that the fitting and a boss member serve as a winding core. The reinforcing layer is made of a fiber reinforced plastic and disposed to cover an outer peripheral surface of the rod-shaped member assembly. The rod-shaped member assembly ensures the strength of the hydrogen tank in the direction of the axis, and the reinforcing layer ensures the strength of the hydrogen tank in the circumferential direction. As a result, the dome reinforcing layer required for a split structure in the related art becomes unnecessary. Therefore, the fiber reinforced plastic for the dome reinforcing layer can be saved. In addition, since the bonding of the body reinforcing layer and the dome reinforcing layer to each other as in the related art is no longer necessary, the increase in the usage amount of the fiber reinforced plastic due to ensuring the bonding area is eliminated. As a result, the usage amount of the fiber reinforced plastic can be reduced. In addition, in the intermediate portion between the first end portion and the second end portion of the rod-shaped member assembly, the rod-shaped members adjacent to each other in the circumferential direction and the radial direction of the hydrogen tank are respectively arranged such that gaps communicating with the through-hole of the fitting are provided. Therefore, hydrogen can be stored using the gaps between the adjacent rod-shaped members.

In the hydrogen tank according to the present disclosure, each of the rod-shaped members may include a rod body, and tabs each having a cylindrical shape that are respectively fitted onto both end portions of the rod body to cover the end portions of the rod body in a longitudinal direction of the rod body; and

- in the first end portion and the second end portion, the tabs adjacent to each other in the circumferential direction and the radial direction are bonded to each other.

The tabs having a cylindrical shape that are fitted onto both end portions of the rod body are thicker than the rod body. By bonding the tabs to each other, the bonding strength between the adjacent rod-shaped members can be increased, and the gap between the adjacent rod bodies in the intermediate portion can be ensured to be large. Therefore, the hydrogen storage amount can be increased.

In the hydrogen tank according to the present disclosure, a liner having a cylindrical shape may be disposed between the rod-shaped member assembly and the reinforcing layer. In this way, hydrogen gas can be more suitably stored.

According to the present disclosure, the usage amount of the fiber reinforced plastic can be reduced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
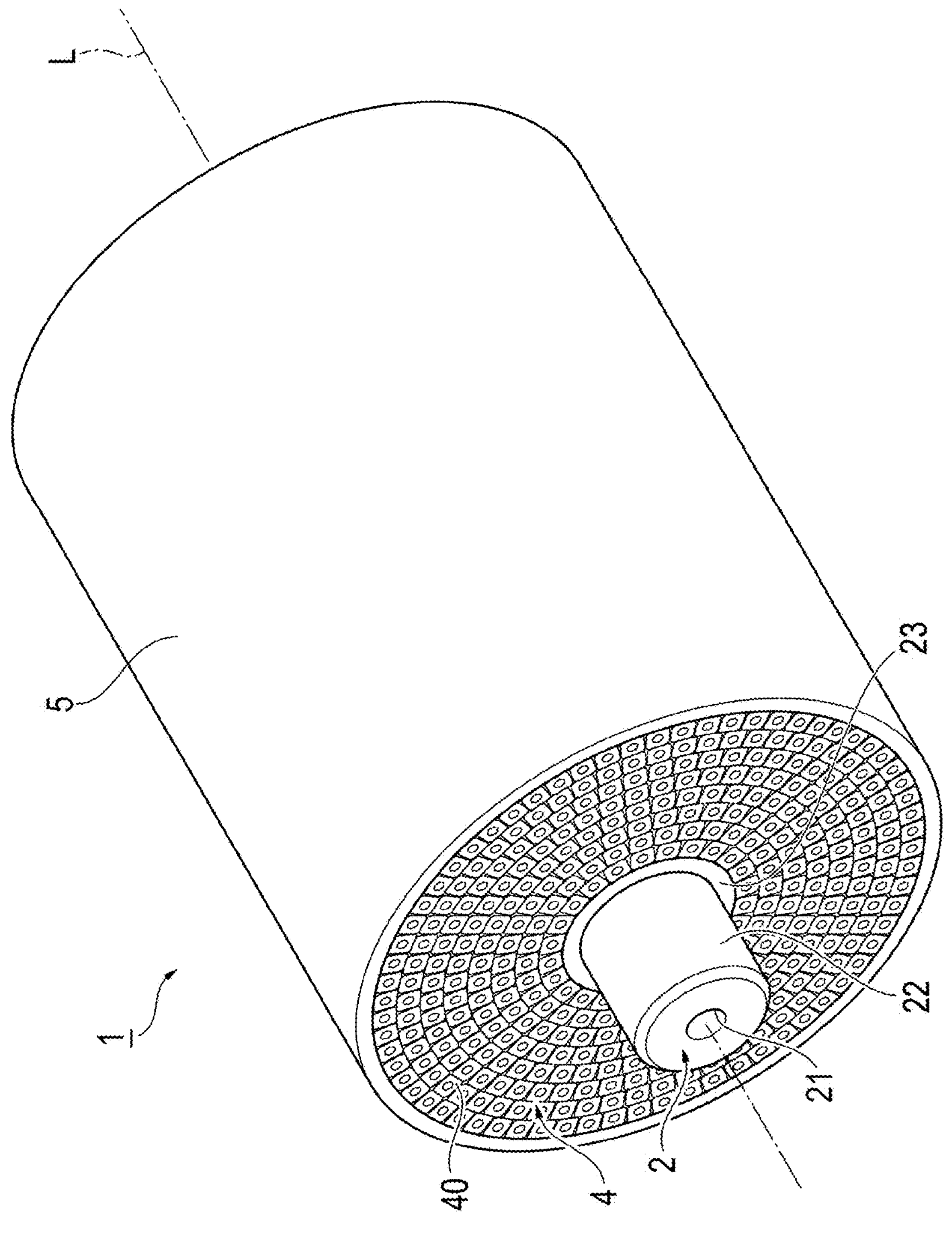
FIG. 1 is a perspective view showing a hydrogen tank according to an embodiment.

Hereinafter, embodiments of a hydrogen tank according to the present disclosure will be described with reference to the drawings. The same reference numerals are given to the same elements in the description of the drawings, and the redundant description thereof will be omitted. Further, in the following description, unless otherwise specified, the "direction of the axis" refers to the direction of the axis of the hydrogen tank, the "circumferential direction" refers to the circumferential direction of the hydrogen tank, and the "radial direction" refers to the radial direction of the hydrogen tank.

Regarding Hydrogen Tank

Figure 2:
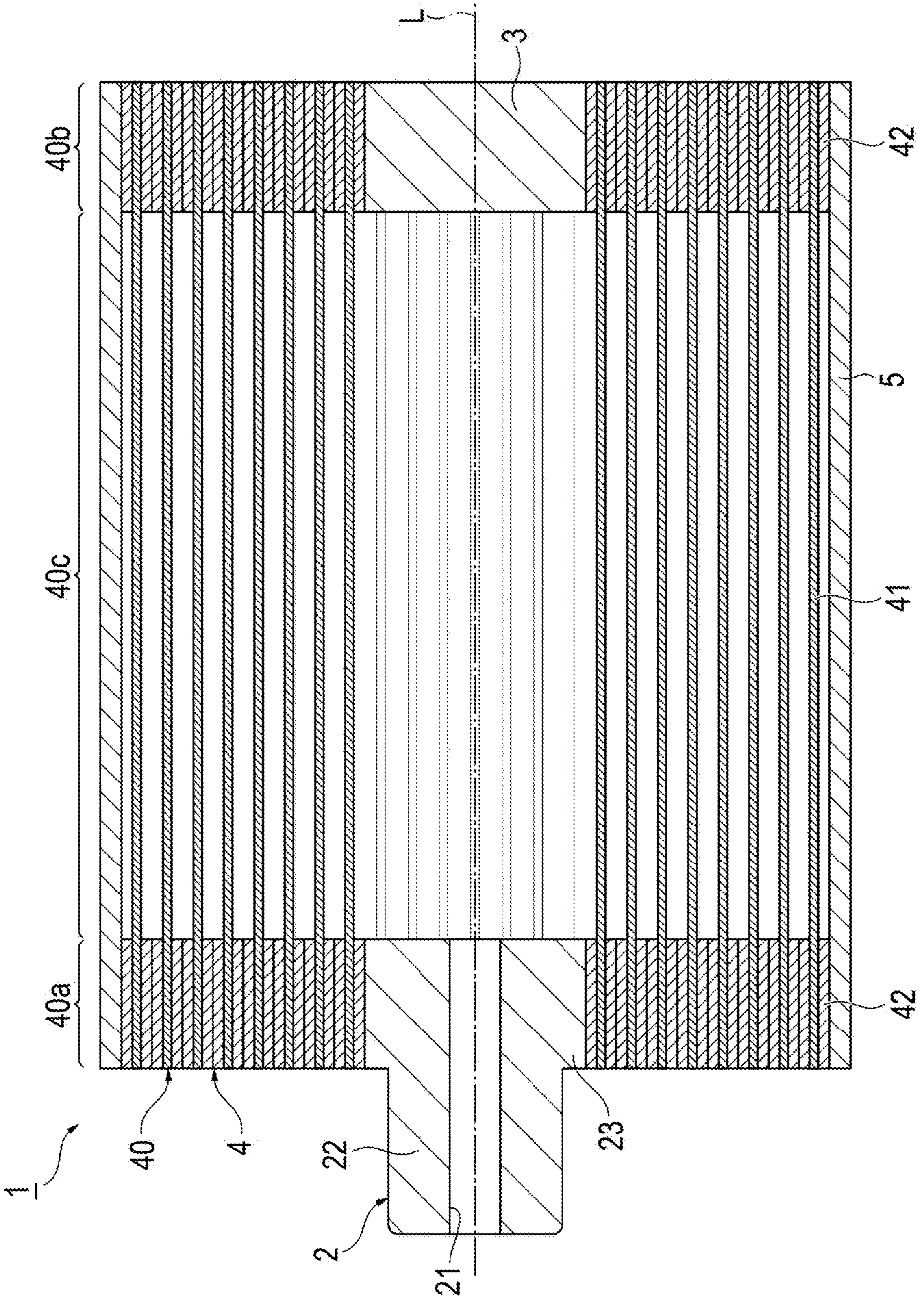
FIG. 2 is a cross-sectional view showing a hydrogen tank according to the embodiment.
Figure 3:
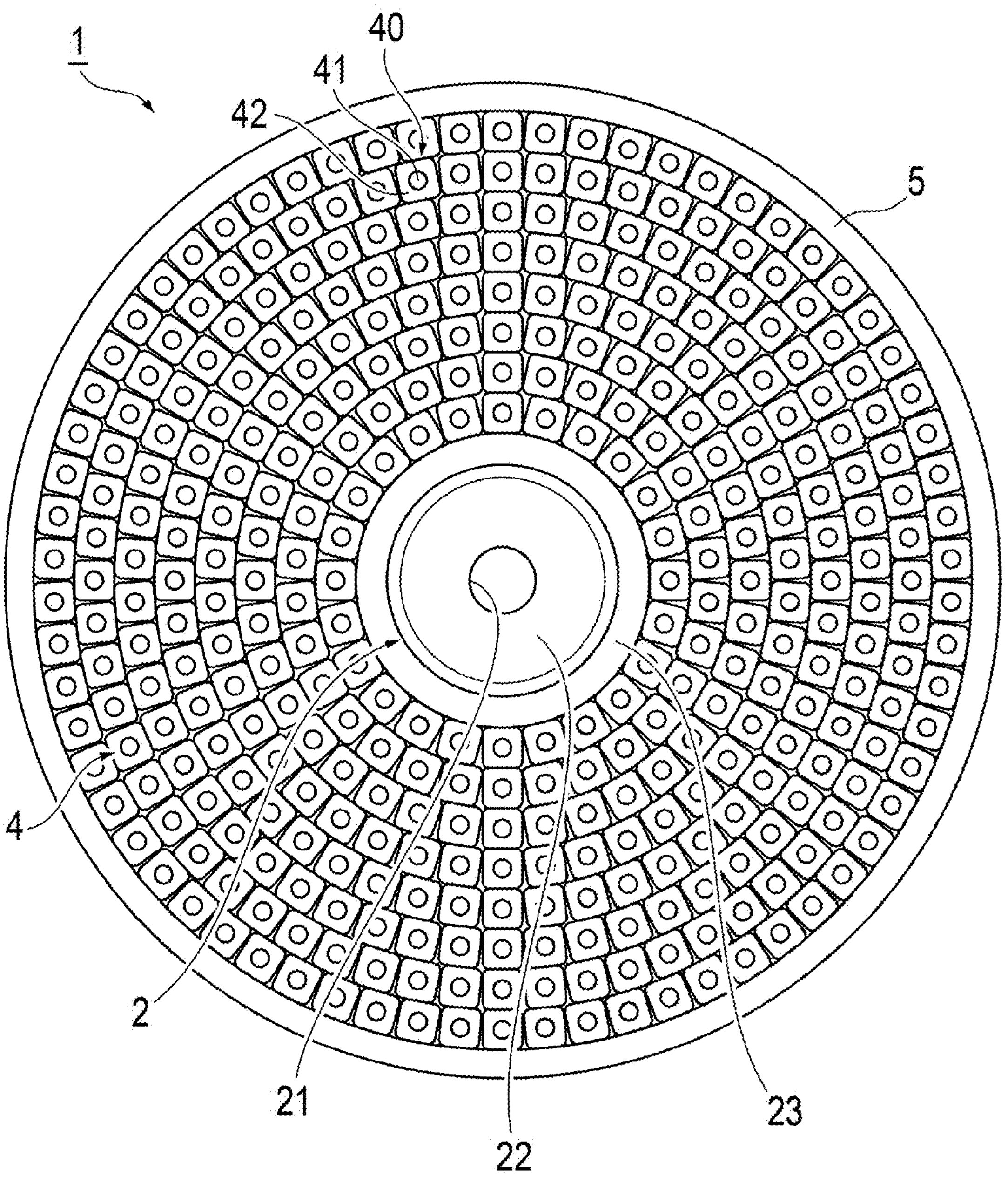
FIG. 3 is a front view showing a fitting side of the hydrogen tank.

FIG. 1 is a perspective view showing a hydrogen tank according to an embodiment, FIG. 2 is a cross-sectional view showing the hydrogen tank according to the embodiment, and FIG. 3 is a front view showing a fitting side of the hydrogen tank. The hydrogen tank 1 of the present embodiment is a tank having a circular cross section and having a space for storing high-pressure hydrogen inside. The hydrogen tank 1 includes a fitting 2 disposed at one end portion of the hydrogen tank 1, a boss member 3 disposed at the other end portion of the hydrogen tank 1, a rod-shaped member assembly 4 disposed around the fitting 2 and the boss member 3 so as to wind the fitting 2 and the boss member 3, and a reinforcing layer 5 covering an outer peripheral surface of the rod-shaped member assembly 4.

The fitting 2 has a stepped cylindrical shape in which a through hole 21 is formed in the inside, and has a small-diameter portion 22 having a relatively small outer diameter and a large-diameter portion 23 having a relatively large outer diameter. The large-diameter portion 23 is held in a state of being surrounded by the rod-shaped member assembly 4. On the other hand, the small-diameter portion 22 is integrally formed with the large-diameter portion 23 and protrudes from the rod-shaped member assembly 4. The small-diameter portion 22 is for fitting with a valve member (not shown). The through hole 21 extends in the direction of the axis L of the hydrogen tank 1 and penetrates the small-diameter portion 22 and the large-diameter portion 23. The fitting 2 having such a structure is formed of a metal material, such as stainless steel or an aluminum alloy, or fiber reinforced plastics (FRP).

As shown in FIG. 2, the boss member 3 is disposed to face the fitting 2 in the direction of the axis L. The boss member 3 has a cylindrical shape, and an outer diameter thereof has the same size as the large-diameter portion 23 of the fitting 2. The boss member 3 is formed of a metal, such as stainless steel or an aluminum alloy, or a fiber reinforced plastic, for example, in the same manner as the fitting 2.

The rod-shaped member assembly 4 is a cylindrical assembly formed by arranging a plurality of elongated rod-shaped members 40 in which a first end portion is disposed on the fitting 2 side and a second end portion is disposed on the boss member 3 side in the circumferential direction and the radial direction of the hydrogen tank 1 such that the fitting 2 and the boss member 3 are wound around the core. Hereinafter, a first end portion of the rod-shaped member 40 disposed on the fitting 2 side is referred to as a "fitting-side end portion 40*a*", and a second end portion of the rod-shaped member 40 disposed on the boss member 3 side is referred to as a "boss member-side end portion 40*b*".

Then, the rod-shaped members 40 adjacent to each other in the circumferential direction and the radial direction of the hydrogen tank 1 are bonded to each other so as to have air tightness at the fitting-side end portion 40*a* and the boss member-side end portion 40*b* of the rod-shaped member 40. Further, in the intermediate portion 40*c* between the fitting-side end portion 40*a* and the boss member-side end portion 40*b* in the rod-shaped member 40, the rod-shaped members 40 adjacent to each other in the circumferential direction and the radial direction of the hydrogen tank 1 are respectively arranged to have a gap communicating with the through hole 21 of the fitting 2.

More specifically, as shown in FIG. 2, the rod-shaped member 40 includes a rod body 41 and cylindrical tabs 42 that are respectively extrapolated to both end portions of the rod body 41 so as to cover both end portions of the rod body 41 in the longitudinal direction of the rod body 41. The rod body 41 is, for example, a round rod having a circular cross section. The tab 42 has a cylindrical shape in which a through hole into which the rod body 41 can be inserted is formed. The tabs 42 are extrapolated to both end portions of the rod body 41 in the longitudinal direction. Among the tabs 42 extrapolated to both end portions of the rod body 41 in the longitudinal direction, one tab 42 constitutes the fitting-side end portion 40*a* of the rod-shaped member 40, and the other tab 42 constitutes the boss member-side end portion 40*b* of the rod-shaped member 40.

In addition, the tabs 42 adjacent to each other in the circumferential direction and the radial direction of the hydrogen tank 1 are bonded to each other so as to have air tightness at the fitting-side end portion 40*a* of the rod-shaped member 40. Similarly, the tabs 42 adjacent to each other in the circumferential direction and the radial direction of the hydrogen tank 1 are also bonded to each other so as to have air tightness at the boss member-side end portion 40*b* of the rod-shaped member 40.

As shown in FIG. 3, the rod-shaped members 40 form a plurality of layers (eight layers in FIG. 3) around the fitting 2. More specifically, a first layer formed of a plurality of rod-shaped members 40 surrounding the large-diameter portion 23 is disposed closest to the large-diameter portion 23 of the fitting 2. Then, a second layer made of a plurality of rod-shaped members 40 is disposed on the outside of the first layer, a third layer is disposed on the outside of the second layer, and an eighth layer is disposed on the outside of the seventh layer. In each layer (that is, in the circumferential direction of the hydrogen tank 1), the tabs 42 of the adjacent rod-shaped members 40 are bonded to each other by an adhesive. In addition, in the adjacent layers (that is, in the radial direction of the hydrogen tank 1), the tabs 42 of the adjacent rod-shaped members 40 are also bonded to each other by the adhesive. As the adhesive, for example, a flexible resin such as an epoxy adhesive is used.

The reinforcing layer 5 has a function of reinforcing the rod-shaped member assembly 4 to improve the mechanical strength, such as the rigidity and the pressure resistance of the hydrogen tank 1, and has a plurality of layers formed of a fiber-reinforced resin. The fiber-reinforced resin is formed, for example, by impregnating a fiber bundle formed by bundling fibers having a diameter of about several m with a thermosetting resin or a thermoplastic resin. Examples of the fiber include carbon fiber, glass fiber, aramid fiber, alumina fiber, boron fiber, steel fiber, PBO fiber, natural fiber, and high-strength polyethylene fiber, and carbon fiber is preferably used in particular from the viewpoint of light weight and mechanical strength.

Examples of the thermosetting resin include an epoxy resin, a modified epoxy resin represented by a vinyl ester resin, a phenolic resin, a melamine resin, a urea resin, an unsaturated polyester resin, an alkyd resin, a polyurethane resin, and a thermosetting polyimide resin. Examples of the thermoplastic resin include polyether ether ketone, polyphenylene sulfide, polyacrylate, polyimide, and polyamide.

The hydrogen tank 1 according to the present embodiment includes a rod-shaped member assembly 4 formed by arranging an elongated rod-shaped member 40 in the circumferential direction and the radial direction of the hydrogen tank 1 such that the fitting 2 and the boss member 3 are wound around the core, and a reinforcing layer 5 made of a fiber-reinforced resin disposed to cover the outer peripheral surface of the rod-shaped member assembly 4. The rod-shaped member assembly 4 secures the strength of the hydrogen tank 1 in the direction of the axis L, and the reinforcing layer 5 secures the strength of the hydrogen tank 1 in the circumferential direction. As a result, the dome reinforcing layer needed in the related art split structure is not needed, so that the fiber reinforced plastic for the dome reinforcing layer can be saved. In addition, since there is no need to bond the body reinforcing layer and the dome reinforcing layer as in the related art, the increase in the amount of the fiber reinforced plastic due to the securing of the bonding area is eliminated. As a result, the amount of the fiber reinforced plastic can be reduced, and the production cost of the hydrogen tank 1 can be reduced and the hydrogen tank 1 can be made lighter.

In addition, in the intermediate portion 40*c* between the fitting-side end portion 40*a* and the boss member-side end portion 40*b* of the rod-shaped member assembly 4, the rod-shaped members 40 adjacent to each other in the circumferential direction and the radial direction are respectively arranged to have a gap communicating with the through hole 21 of the fitting 2, so that hydrogen can be stored in the gap between the adjacent rod-shaped members 40.

Further, the rod-shaped member 40 has a rod body 41 and cylindrical tabs 42 that are respectively extrapolated to both end portions of the rod body 41 so as to cover both end portions of the rod body 41 in the longitudinal direction of the rod body 41. In the fitting-side end portion 40*a* and the boss member-side end portion 40*b* of the rod-shaped member 40, the tabs 42 adjacent to each other in the circumferential direction and the radial direction of the hydrogen tank 1 are respectively bonded to each other. Since the tabs 42 are thicker than the rod body 41, the adhesive strength between the adjacent rod-shaped members 40 can be increased by bonding the tabs 42 to each other, and the gap between the adjacent rod bodies 41 in the intermediate portion 40*c* can be secured to be large. As a result, the amount of hydrogen stored in the hydrogen tank 1 can be increased.

In addition, since a plurality of the rod-shaped members 40 can be independently bonded, it is possible to improve the adhesion strength of the rod-shaped member 40 by increasing the bonding area. For example, the outer diameter of the tab 42 in the rod-shaped member 40 is increased, or the length of the tab 42 in the direction of the axis L is increased, so that the outer peripheral area of the tab 42 is increased, and thus the area of the adhesive surface between the adjacent tabs 42 can be increased. Therefore, it is possible to increase the adhesive strength between the adjacent rod-shaped members 40.

In addition, the number of the rod-shaped members 40 arranged in the radial direction of the hydrogen tank 1 is increased or decreased, so that the hydrogen storage amount of the hydrogen tank 1 can be easily changed. Therefore, the hydrogen tank 1 can be suitably coped with the production of the hydrogen tank having a different diameter. In addition, since there is no need to make the dome portion and the dome reinforcing layer that are matched to the outer diameter of the tank as in the related art, the hydrogen tank 1 having different diameters can be easily manufactured.

Further, since the adjacent rod-shaped members 40 are bonded by a flexible resin such as an epoxy adhesive, each rod-shaped member 40 can be slightly moved in the direction of the axis L with respect to the tensile load in the direction of the axis L, and thus uniform tensile stress can be obtained. Therefore, the stress concentration can be alleviated as compared with a hydrogen tank having a conventional dome reinforcing layer. Further, since the reinforcing layer 5 extending in the direction of the axis L of the hydrogen tank 1 is hardly deformed in the direction of the axis L, the generation of cracks can be suppressed.

Further, since the rod-shaped member assembly 4 is configured by the arrangement of the rod-shaped members 40, for example, a strain gauge is installed in each rod-shaped member 40, and the health monitoring of the hydrogen tank 1 is easily performed based on the detection result of the installed strain gauge. That is, in a case where the rod-shaped member 40 is damaged, the rigidity of the rod-shaped member 40 is reduced, and the damaged rod-shaped member 40 jumps out of the rod-shaped member assembly 4 due to the reduced rigidity. The health monitoring of the hydrogen tank 1 can be easily performed by detecting the deformation with the strain gauge.

Various modification examples are also conceivable for the hydrogen tank in addition to the above description.

Modification Example 1

For example, a cylindrical liner may be disposed between the rod-shaped member assembly 4 and the reinforcing layer 5. The liner is formed in a cylindrical shape by a material having, for example, gas barrier properties. Examples of such a material include a resin material, such as polyethylene or nylon, and a metal material, such as aluminum or an aluminum alloy. By disposing the liner between the rod-shaped member assembly 4 and the reinforcing layer 5, hydrogen gas can be more suitably stored.

Modification Example 2

Figure 5:
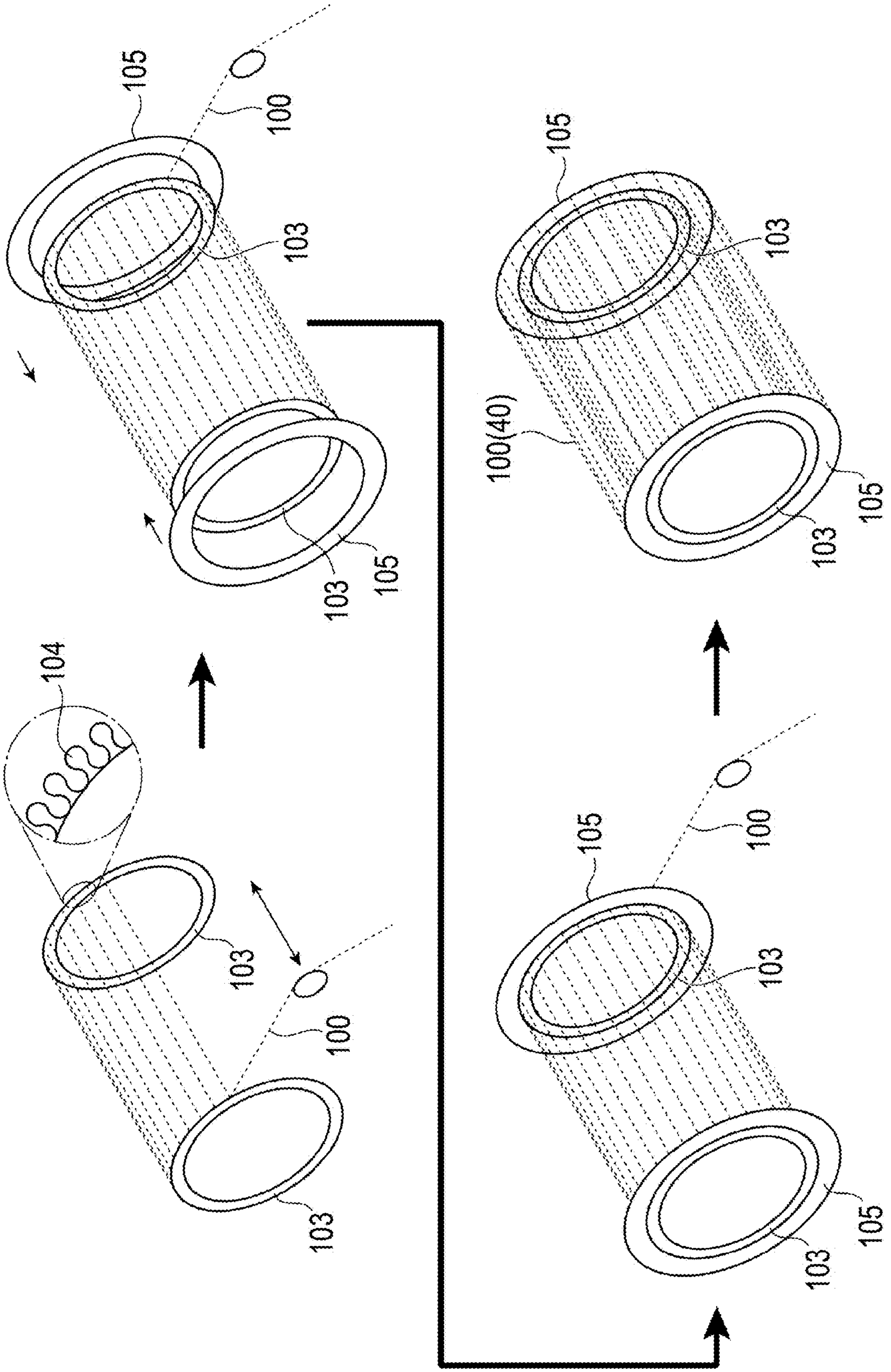
FIG. 5 is a schematic diagram for describing a manufacturing method of the hydrogen tank (batch production method in units of rod tanks)
Figure 6:
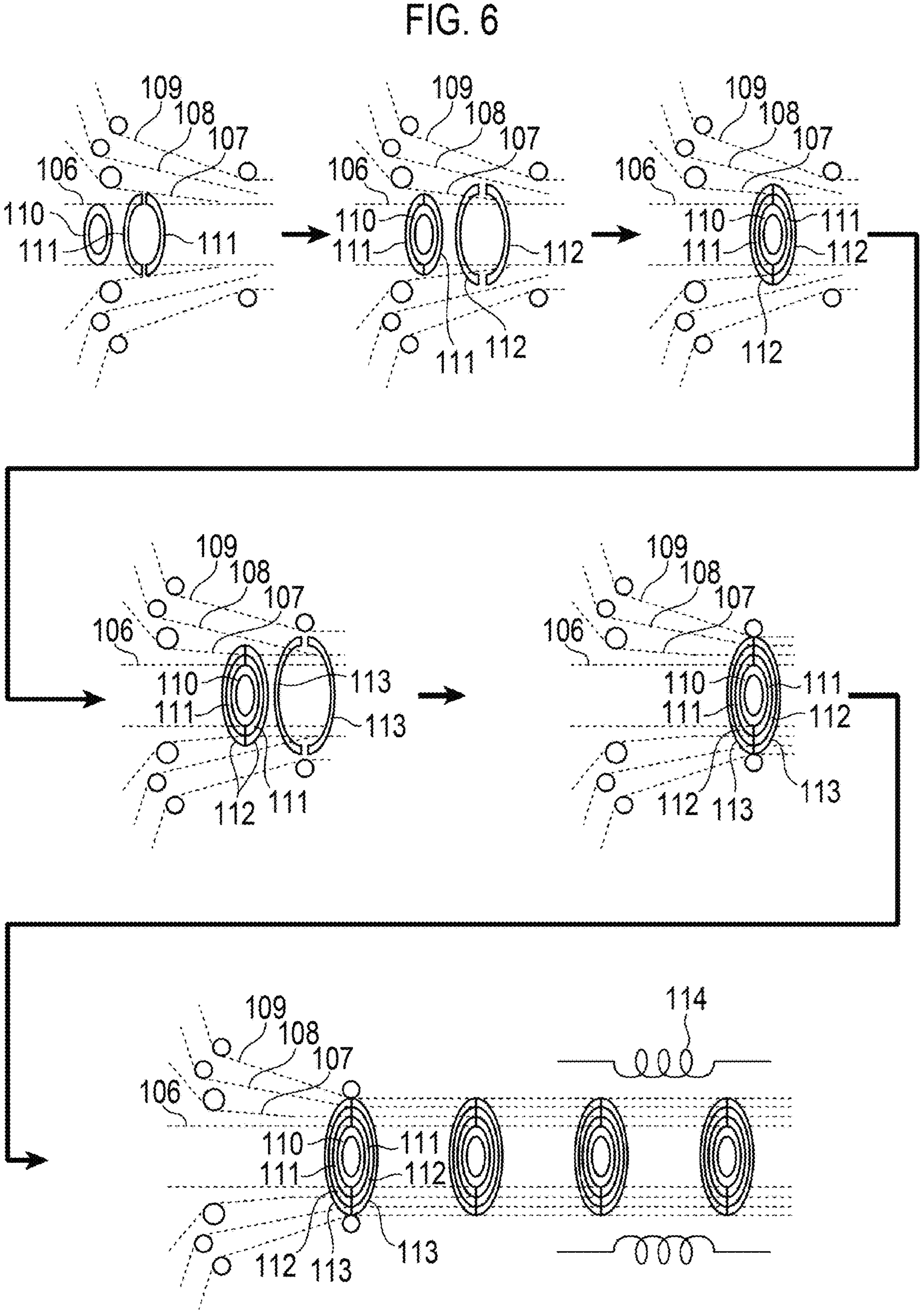
FIG. 6 is a schematic diagram for describing a manufacturing method of the hydrogen tank (continuous production method by rod tank unit)

In addition, the rod-shaped member assembly 4 may not have the tab 42. In this case, for example, the space of 42 tabs is filled with an adhesive. That is, a resin having adhesiveness is used instead of the tab 42. In addition, as shown in FIGS. 5 and 6 described below, a ring member that bundles a plurality of rod-shaped members in a laminated manner can be used instead of the tab 42.

Modification Example 3

The boss member 3 may have a through hole communicating with a gap for storing hydrogen gas. That is, the boss member 3 has the same structure as the fitting 2. As described above, the hydrogen tank having two fittings can be suitably applied to the enlargement of the hydrogen tank.

Manufacturing Method of Hydrogen Tank

Hereinafter, a method of manufacturing the hydrogen tank will be described. As a method of manufacturing the hydrogen tank, a rod unit batch production method (see FIG. 4), a rod tank unit batch production method (see FIGS. 5, 7A, and 7B), and a rod tank unit continuous production method (see FIGS. 6, 7A, and 7B) are mainly used. The "rod" here means a rod-shaped member. In FIGS. 4 to 7B, the fiber bundle 100 and the rod-shaped member 40 may be shown by a broken line in order to facilitate the description.

The rod unit batch production method is a method applied to the hydrogen tank 1 described in the embodiment, that is, a production method applied to a tank using the rod-shaped member 40 having the tab 42. The rod unit batch production method includes a winding step S11, a curing and cutting step S12, a tab attachment step S13, and an assembling step S14.

Figure 4:
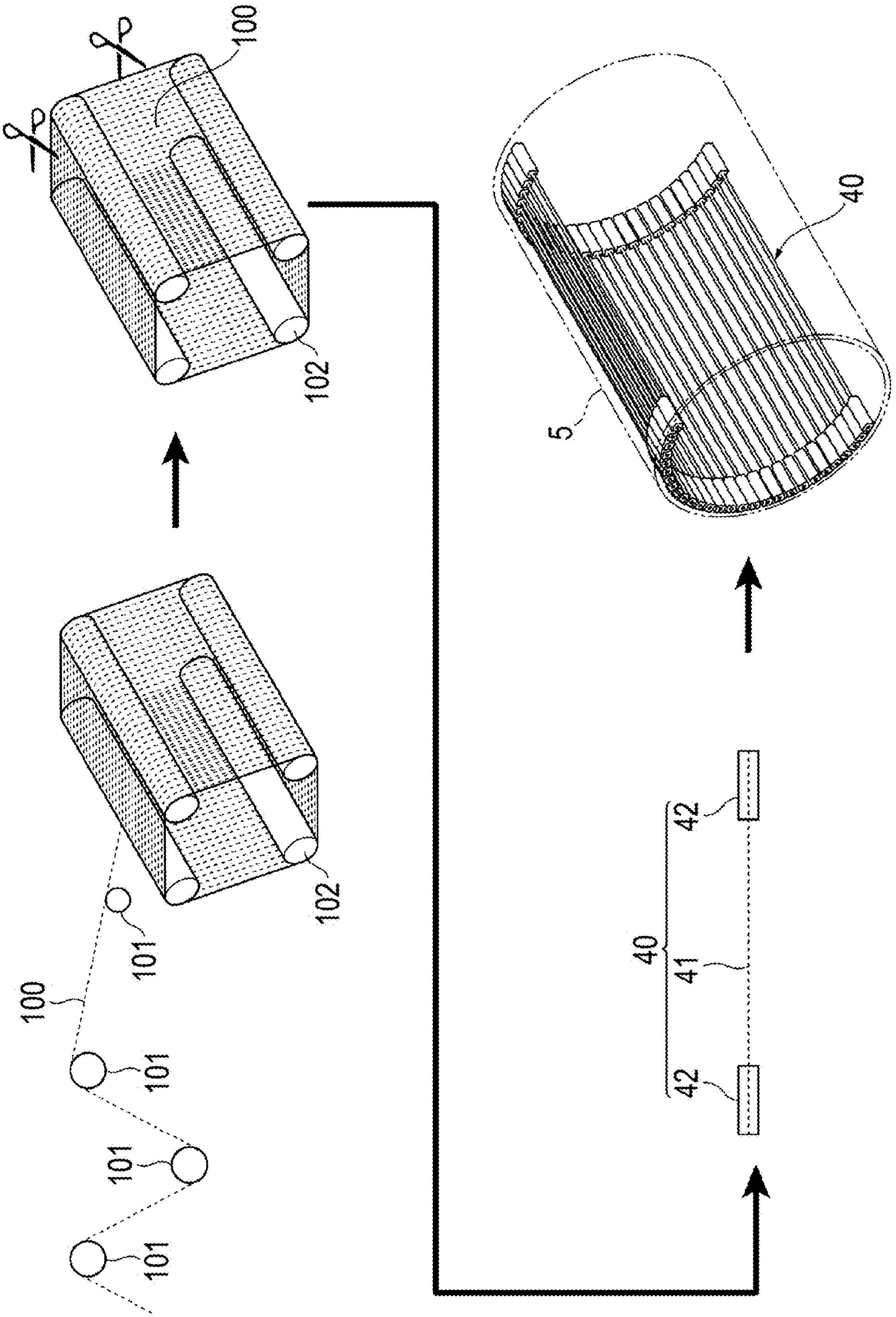
FIG. 4 is a schematic diagram for describing a manufacturing method of the hydrogen tank (batch production method in units of rods)

In the winding step S11, the fiber bundle 100 unwound from a bobbin (not shown) is wound around a rectangular parallelepiped-shaped mold frame 102 formed by connecting four cylindrical members after the tension adjustment is performed by a plurality of rollers 101 (see FIG. 4). The fiber bundle 100 is formed by, for example, bundling carbon fibers having a diameter of about several m, and is impregnated with an uncured thermosetting resin (for example, an epoxy resin).

In the curing and cutting step S12, the fiber bundle 100 wound around the mold frame 102 is transported to a curing furnace, is cured by heating, and then the fiber bundle 100 is cut to a length needed for the rod-shaped member 40 (see FIG. 4). In the tab attachment step S13, the tabs 42 are attached to both end portions of each of the cut fiber bundles 100. The tab 42 is formed of a metal material or a hard resin material. As a result, the rod-shaped member 40 having the rod body 41 and the tab 42 is produced (see FIG. 4).

Here, the production of the reinforcing layer 5 will be described. The reinforcing layer 5 is produced by, for example, a filament winding method or a sheet winding method. In the filament winding method, first, a plurality of carbon fiber bundles in which an uncured thermosetting resin (for example, an epoxy resin) is impregnated is wound (hooped) around the outer peripheral surface of a cylindrical mandrel to form a wound body for a reinforcing layer. Next, the formed winding body for the reinforcing layer is cured by heating and then removed from the mandrel. In this way, the cylindrical reinforcing layer 5 is produced.

On the other hand, in the sheet winding method, a fiber sheet having a predetermined width is wound around the outer peripheral surface of a cylindrical mandrel a plurality of times to form a wound body for a reinforcing layer, and the formed wound body for a reinforcing layer is removed from the mandrel after being cured by heating. In this way, the cylindrical reinforcing layer 5 is produced. The fiber sheet used is, for example, a sheet in which a unidirectionally aligned carbon fiber is impregnated with a thermosetting resin.

In the assembling step S14, the rod-shaped members 40 are sequentially pasted on the inner wall surface of the cylindrical reinforcing layer 5 to produce the rod-shaped member assembly 4 (see FIG. 4). Specifically, for example, the tab 42 of the rod-shaped member 40 is sequentially attached to the inner wall surface of the reinforcing layer 5 with an epoxy adhesive along the outer circumferential direction of the reinforcing layer 5, whereby the rod-shaped member 40 of the outermost layer (eighth layer in the example shown in FIG. 3) of the rod-shaped member assembly 4 is formed. In addition, at this time, the tabs 42 of the adjacent rod-shaped members 40 are also bonded to each other with the epoxy adhesive. In FIG. 4, the reinforcing layer 5 is shown by a two-dot chain line, and the rod-shaped member 40 is shown by a solid line in order to facilitate the description.

Next, the 7th rod-shaped member 40 is formed by sticking the rod-shaped member 40 to the inner wall surface of the 8th rod-shaped member 40 with an epoxy adhesive. At this time, the tabs 42 of the adjacent rod-shaped members 40 are also bonded to each other with the epoxy adhesive. Thereafter, the above operation is repeated to form the rod-shaped member 40 of the sixth layer, the fifth layer, . . . , the first layer. As a result, the rod-shaped member assembly 4 is produced in the inside of the reinforcing layer 5.

Next, the boss member 3 and the fitting 2, which are prepared in advance, are respectively inserted into both ends of the prepared rod-shaped member assembly 4, and the rod-shaped member assembly 4 is bonded to the boss member 3 and the fitting 2 with an epoxy adhesive. As a result, the hydrogen tank 1 described above is produced.

The batch production method by the rod tank unit is a production method applied to a tank using a rod-shaped member 40 having no tabs. The batch production method of the rod tank unit includes a rod-shaped member assembly forming step S21, a reinforcing layer forming step S22, and an assembling step S23.

In the step S21 of forming the rod-shaped member assembly, a pair of first ring members 103 facing each other in the direction of the axis is prepared. As shown in FIG. 5, a plurality of winding projection portions 104 are formed at equal intervals on the outer peripheral edge portion of each first ring member 103. The first ring member 103 and the ring member to be described later are formed of, for example, a metal material or a hard resin material.

Next, the fiber bundles 100 are bridged between the two first ring members 103 facing each other to form a first layer that is positioned most inward of the rod-shaped member assembly 4. In this case, after winding the fiber bundle 100 around one winding projection portion 104 in one first ring member 103 of the two first ring members 103, the fiber bundle 100 is transported toward the other first ring member 103 facing the one first ring member 103 to be parallel to the direction of the axis, and the fiber bundle 100 is wound around the winding projection portion 104 of the other first ring member 103.

Next, the fiber bundle 100 is wound on the winding projection portion 104 adjacent to the winding projection portion 104 on which the fiber bundle 100 is wound, and then the fiber bundle 100 is folded back and transported toward one first ring member 103 (see FIG. 5). The fiber bundle 100 is, for example, a fiber bundle formed by bundling carbon fibers having a diameter of about several m, and is impregnated with an uncured thermosetting resin (for example, an epoxy resin). In addition, the fiber bundle 100 is configured to be reciprocally movable in the direction of the axis.

Then, after the first layer of the rod-shaped member assembly 4 is formed, two second ring members 105 are prepared. The second ring member 105 is formed to be slightly larger than the outer diameter of the first ring member 103 such that the first ring member 103 can be fitted into the second ring member 105. The second ring member 105 has a plurality of winding projection portions disposed at equal intervals on the outer peripheral edge portion, similarly to the first ring member 103.

Next, the second ring member 105 is extrapolated to the first ring member 103 on which the first layer is formed (see FIG. 5), and then the second layer of the rod-shaped member assembly 4 is formed by the same method as the formation of the first layer (see FIG. 5). Subsequently, the third layer, the fourth layer, and the eighth layer are sequentially formed by repeating the above method, and then the formed layers are cured by heating. In this way, the rod-shaped member assembly 4 is produced.

In the reinforcing layer forming step S22, the method of manufacturing the reinforcing layer 5 described in the rod unit batch production method is used. The description thereof will be omitted.

Figure 7A:
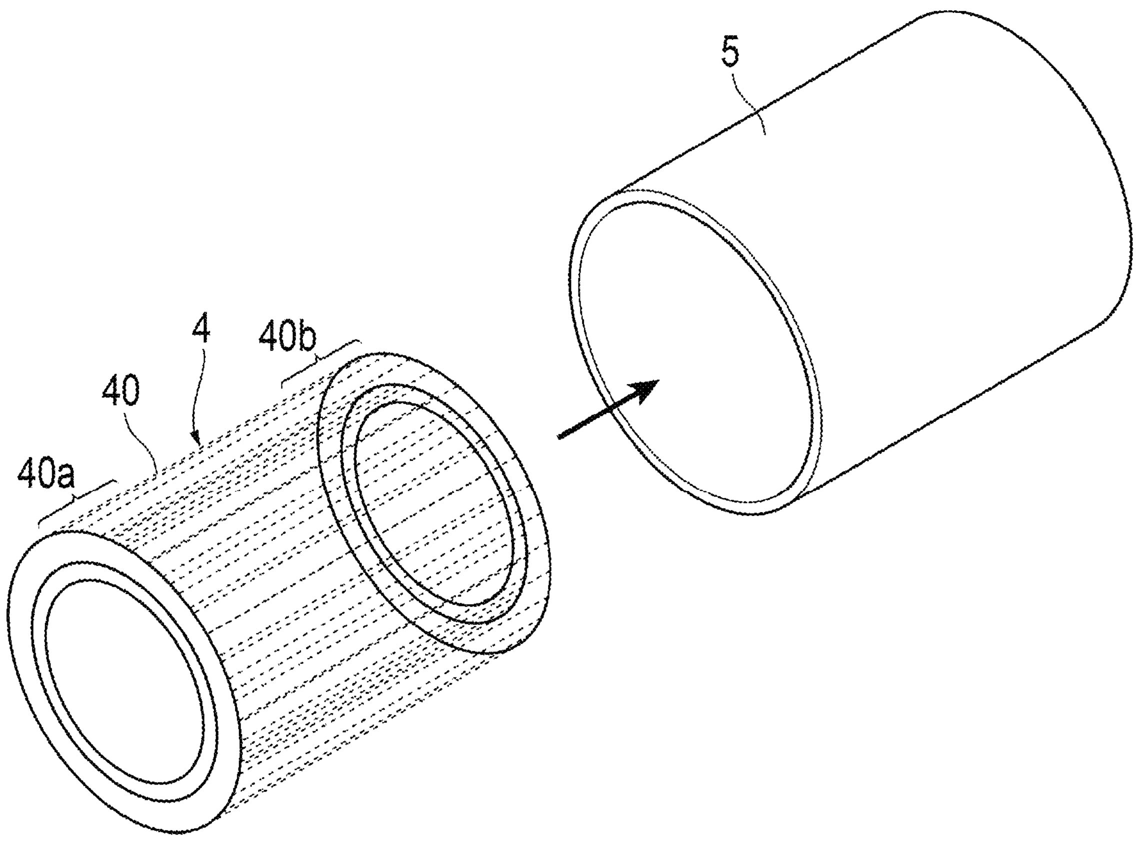
FIG. 7A is a schematic diagram for describing a manufacturing method of a hydrogen tank.
Figure 7B:
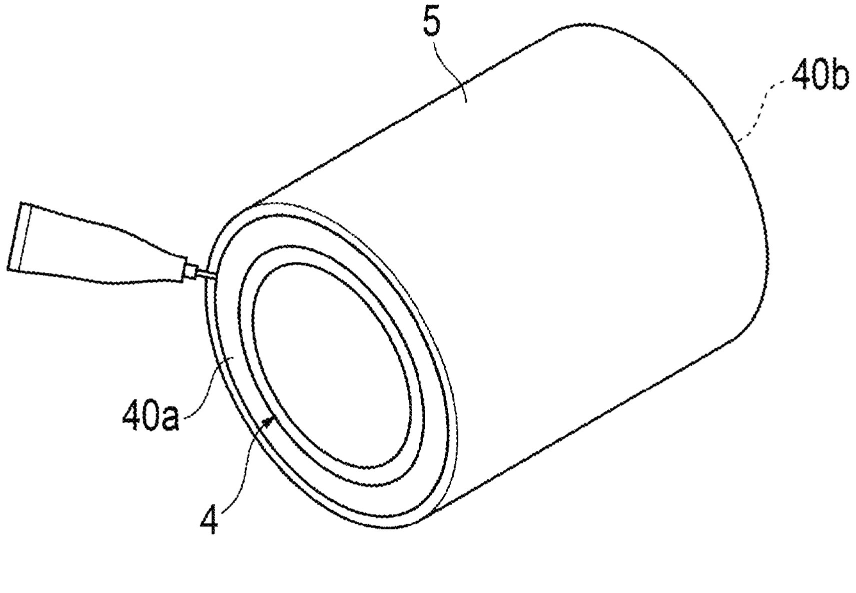
FIG. 7B is another schematic view for describing the manufacturing method of the hydrogen tank.

In the assembling step S23, two methods shown in FIGS. 7A and 7B can be used. In the method shown in FIG. 7A, first, the adhesive (for example, an epoxy adhesive) is applied to the end portions of the rod-shaped members 40 that are the boss member-side end portion 40*b* and the fitting-side end portion 40*a*, respectively, of the rod-shaped member assembly 4 manufactured in the rod-shaped member assembly forming step S21, thereby bonding the adjacent rod-shaped members 40 to each other at the end portions. At this time, the adhesive is also applied to the outer peripheral surface of the rod-shaped member assembly 4 (more specifically, the outer peripheral surface of the fitting-side end portion 40*a* and the outer peripheral surface of the boss member-side end portion 40*b*) that is in contact with the reinforcing layer 5 between the adjacent ring members (for example, between the first ring member 103 and the second ring member 105). Next, the adhesive-applied rod-shaped member assembly 4 is inserted into the inside of the reinforcing layer 5, and the adhesive is dried to bond the rod-shaped member assembly 4 and the reinforcing layer 5.

Next, the fitting 2 and the boss member 3 that are prepared in advance are respectively inserted into both ends of the rod-shaped member assembly 4, and the fitting 2 and the boss member 3 are respectively bonded to the rod-shaped member assembly 4 using an epoxy adhesive. As a result, the hydrogen tank is manufactured.

On the other hand, in the method shown in FIG. 7B, first, the rod-shaped member assembly 4 manufactured in the rod-shaped member assembly forming step S21 is inserted into the inside of the reinforcing layer 5 manufactured in the reinforcing layer forming step S22. Next, an adhesive (for example, an epoxy adhesive) is injected between the fitting-side end portion 40*a* and the end portion that is the boss member-side end portion 40*b*, between the fitting-side end portion 40*a* and the reinforcing layer 5, and between the boss member-side end portion 40*b* and the reinforcing layer 5. Thereafter, the adhesive is dried to bond the adjacent rod-shaped members 40 to each other at the fitting-side end portion 40*a* and the boss member-side end portion 40*b*, and to bond the rod-shaped member assembly 4 and the reinforcing layer 5 to each other.

Next, the fitting 2 and the boss member 3 that are prepared in advance are respectively inserted into both ends of the rod-shaped member assembly 4, and the fitting 2 and the boss member 3 are respectively bonded to the rod-shaped member assembly 4 using an epoxy adhesive. As a result, the hydrogen tank is manufactured.

The continuous production method by the rod tank unit is a production method applied to a tank using a rod-shaped member 40 having no tabs. The continuous production method by the rod tank unit includes a rod-shaped member assembly forming step S31, a reinforcing layer forming step S32, and an assembling step S33.

In the rod-shaped member assembly forming step S31, an example in which a rod-shaped member assembly 4 having four layers of rod-shaped members 40 as shown in FIG. 6 is formed will be described. In the rod-shaped member assembly forming step S31, the fiber bundle 106 for the first layer, the fiber bundle 107 for the second layer, the fiber bundle 108 for the third layer, and the fiber bundle 109 for the fourth layer are prepared for each bobbin. The fiber bundles 106 to 109 are all the same, and are, for example, fiber bundles formed by bundling carbon fibers having a diameter of about several m, and are impregnated with an uncured thermosetting resin (for example, an epoxy resin).

The fiber bundle 106 for forming the first layer, the fiber bundle 107 for forming the second layer, the fiber bundle 108 for forming the third layer, and the fiber bundle 109 for forming the fourth layer are prepared in the number needed, and are disposed to form a circular tunnel. For example, when 25 rod-shaped members 40 are needed for the formation of the first layer of the rod-shaped member assembly 4, 31 rod-shaped members 40 are needed for the formation of the second layer, 37 rod-shaped members 40 are needed for the formation of the third layer, and 43 rod-shaped members 40 are needed for the formation of the fourth layer, 25 fiber bundles 106, 31 fiber bundles 107, 37 fiber bundles 108, and 43 fiber bundles 109 are respectively prepared.

As shown in FIG. 6, the 25 fiber bundles 106 are disposed most inward and are evenly arranged to form a tunnel having a circular cross section along the outer periphery of the center ring 110. On the outside of the 25 fiber bundles 106, 31 fiber bundles 107 that form a second layer are arranged in a tunnel shape. Outside the 31 fiber bundles 107, 37 fiber bundles 108 are disposed in a tunnel shape, and outside the 37 fiber bundles 108, 43 fiber bundles 109 are disposed in a tunnel shape (see FIG. 6).

Next, the two semicircular ring members 111 that can be fitted to each other are disposed outside (for example, on both right and left sides) of the 25 fiber bundles 106 that form the first layer to bundle the 25 fiber bundles 106, and are fitted to the center ring 110 by extrapolation. In this way, the first layer of the rod-shaped member assembly 4 is formed (see FIG. 6).

Next, the two semicircular ring members 112 that can be fitted to each other are disposed outside (for example, on both right and left sides) of the 31 fiber bundles 107 that form the second layer so as to bind the 31 fiber bundles 107. The semicircular ring member 112 is formed to have a size that allows the pair of semicircular ring members 111 to be inserted into the semicircular ring member 112 in a fitted state. Thereafter, the pair of semicircular ring members 112 are fitted to be extrapolated to the fitted semicircular ring member 111. As a result, the second layer of the rod-shaped member assembly 4 is formed (see FIG. 6).

Next, two semicircular ring members 113 that can be fitted to each other are disposed outside (for example, on both right and left sides) of 37 fiber bundles 108 that are the third layer to bond the 37 fiber bundles 108 (see FIG. 6). The semicircular ring member 113 is formed to have a size that allows the pair of semicircular ring members 112 to be inserted into the semicircular ring member 113 in a fitted state. Thereafter, the pair of semicircular ring members 113 are fitted to be extrapolated to the fitted semicircular ring member 112. As a result, the third layer of the rod-shaped member assembly 4 is formed.

Next, the 43 fiber bundles 109 are evenly arranged to form a tunnel having a circular cross section along the outer periphery of the fitted pair of semicircular ring members 113. As a result, the third layer of the rod-shaped member assembly 4 is formed (see FIG. 6).

Then, the above-described contents are repeatedly performed, whereby a continuous rod-shaped member assembly 4 shown in FIG. 6 is formed. Next, the continuous rod-shaped member assembly 4 is transported to the curing furnace 114, and the thermosetting resin with which the fiber bundles 106 to 109 are impregnated is cured. Thereafter, the continuous rod-shaped member assembly 4 is cut to a needed length. In this way, the rod-shaped member assembly 4 is produced.

In the reinforcing layer forming step S32, the method of manufacturing the reinforcing layer 5 described in the rod unit batch production method is used. The description thereof will be omitted. Since the assembling step S33 is the same as the assembling step S23 described in the batch production system of the rod tank unit, the description thereof will be omitted.

The hydrogen tank is manufactured through the above steps.

Hereinafter, the present disclosure will be described with reference to examples, but the present disclosure is not limited to the examples.

EXAMPLES

In the example, the hydrogen tank 1 (product of the present disclosure) described in the above embodiment was produced. The total weight of the produced product of the present disclosure, the weight of the carbon fiber reinforced plastic (CFRP) used, and the mass efficiency were examined. The results of the examination are summarized in Table 1. The mass efficiency is a ratio of the filling weight of hydrogen to the total weight of the hydrogen tank.

Comparative Example

As a comparative example, a hydrogen tank (conventional product) having a reinforcing layer including a dome reinforcing layer corresponding to the dome portion of the liner and a body reinforcing layer corresponding to the body portion of the liner was produced. When the dome reinforcing layer and the body reinforcing layer are bonded, the end portions of the dome reinforcing layer and the body reinforcing layer are overlapped to have a bonding area. Then, the total weight, the weight of the used CFRP, and the mass efficiency were examined for the produced conventional product in the same manner as in Example. The results of the examination are summarized in Table 1.

TABLE 1

| | Product in the related art | Product in the present disclosure |
|---|---|---|
| Total weight | 42.99 kg/2.3 kg-$H_2$ | 37.73 kg/3.1 kg-$H_2$ |
| CFRP weight | 35.6 kg | 16.0 kg |
| Mass efficiency | 5.3% | 8.2% |

As shown in Table 1, in the case of the present disclosure, the weight of the CFRP used is reduced, the filling amount of hydrogen is increased, and the total weight is reduced as compared with the related art. In addition, the volume efficiency could be improved by 7% as compared with the related art. Therefore, the hydrogen tank according to the present disclosure has an effect of reducing the amount of the fiber reinforced plastic used.

Although the embodiments of the present disclosure have been described in detail above, the present disclosure is not limited to the above embodiments, and various design changes can be made within the scope of the spirit of the present disclosure described in the claims.

What is claimed is:

1. A hydrogen tank comprising:

a fitting having a through-hole;

a boss member disposed on an opposite side of the hydrogen tank from the fitting in a direction of an axis of the hydrogen tank;

a rod-shaped member assembly configured by arranging a plurality of rod-shaped members each having an elongated shape in a circumferential direction and a radial direction of the hydrogen tank such that the fitting and the boss member serve as a winding core, each of the rod-shaped members having a first end portion disposed on a fitting side and a second end portion disposed on a boss member side; and a reinforcing layer made of a fiber reinforced plastic and disposed to cover an outer peripheral surface of the rod-shaped member assembly, wherein in the first end portion and the second end portion, the rod-shaped members adjacent to each other in the circumferential direction and the radial direction are bonded to each other, wherein in an intermediate portion between the first end portion and the second end portion, the rod-shaped members adjacent to each other in the circumferential direction and the radial direction are arranged such that gaps that communicate with the through-hole of the fitting are provided, wherein each of the rod-shaped members includes a rod body, and tabs each having a cylindrical shape that are respectively fitted onto both end portions of the rod body to cover the end portions of the rod body in a longitudinal direction of the rod body, and wherein, in the first end portion and the second end portion, the tabs adjacent to each other in the circumferential direction and the radial direction are bonded to each other.

2. The hydrogen tank according to claim 1, wherein a liner having a cylindrical shape is disposed between the rod-shaped member assembly and the reinforcing layer.

* * * * *